UNITED STATES PATENT OFFICE.

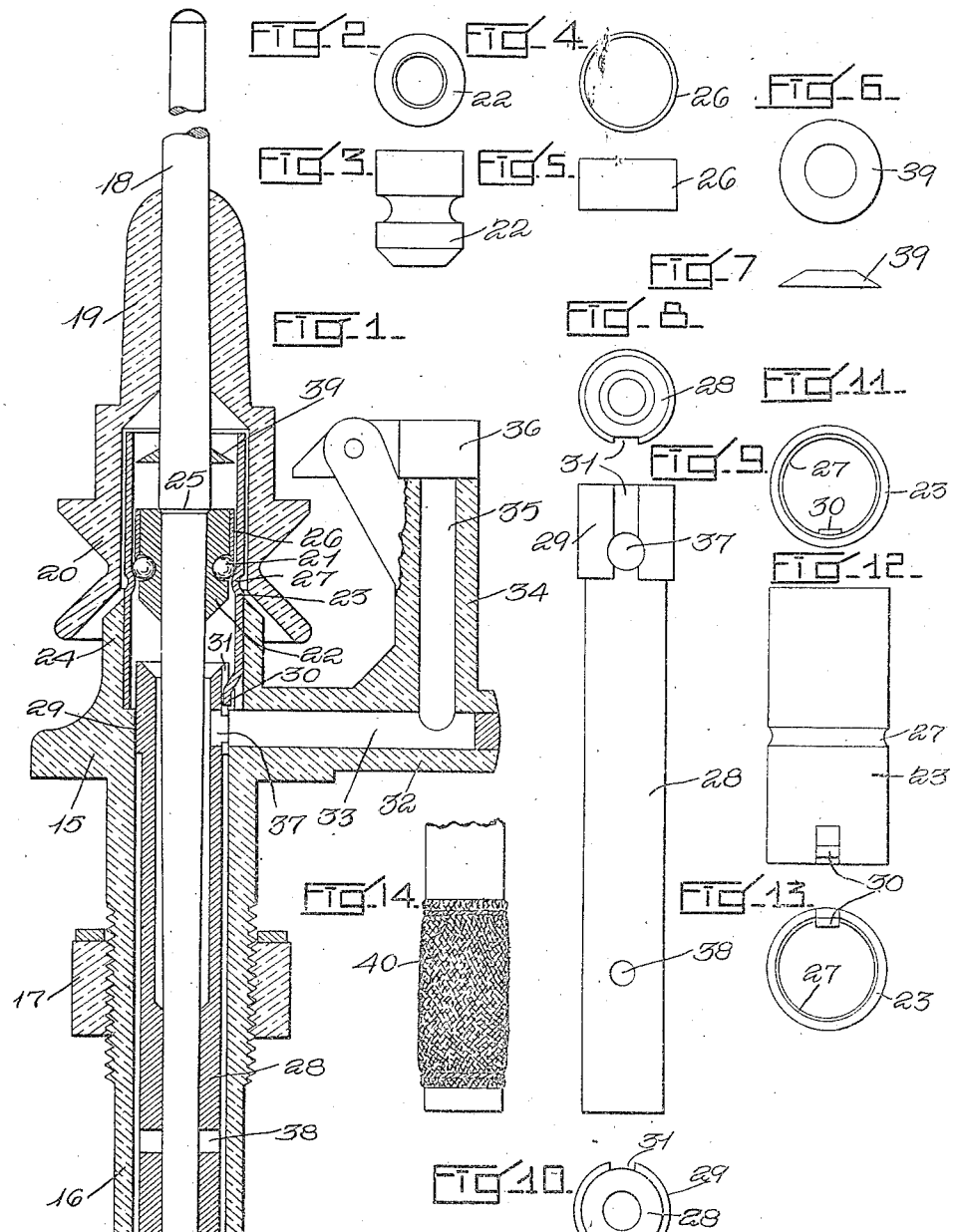

FRED HILDRETH CHAPMAN, OF WINCHESTER, MASSACHUSETTS.

SPINDLE.

1,253,351.  Specification of Letters Patent.  Patented Jan. 15, 1918.

Application filed November 27, 1916. Serial No. 133,556.

*To all whom it may concern:*

Be it known that I, FRED HILDRETH CHAPMAN, a citizen of the United States, residing at Winchester, in the county of Middlesex and State of Massachusetts, have invented new and useful Improvements in Spindles, of which the following is a specification.

My invention relates to spindles of the type which are employed in machines for spinning or twisting yarns, thread, etc., and more particularly to that species of spindle which is provided with a whirl driven by a band or tape from a rapidly rotating drum. Spindles of this type have long been known and widely used. As the result of experience extending over a number of years in the manufacture of spindles and observation of their mode of operation, I have discovered that certain conditions must exist to make a spindle commercially successful, and that all of the spindles in commercial use fail in various particulars to meet the conditions required to secure the best results. I have devised certain improvements and novel features which I believe fulfil the conditions observed as above stated, and these improvements form the subject of the present application and of the claims appended thereto.

A brief statement of the conditions to which I have referred will be helpful to a complete understanding of the principles and utility of the invention. It is a practical impossibility to secure perfect identity with the geometrical axis of the spindle of the center of gravity of the mass composed of a spindle and a bobbin thereon, wherefore the step bearing of the spindle must be made with provision for a lateral movement in order that the spindle may so place itself as to rotate about an axis passing through this center of gravity. Otherwise it would be impossible to obtain smooth and quiet running of the spindle at the high speeds which are employed in spinning, and for all practical purposes the spindle would be totally inoperative. Further, as annular ball bearings are exceedingly efficient under moderate thrust load, and as the axial load on spindles is very light, it is desirable to use a ball bearing in a spindle for the obvious purpose of economizing power, improving the quality of the yarn by insuring uniformity of twist, and increasing the useful life of the spindle. The same considerations make it desirable to have the ball bearing as near as possible in the center or line of pull applied by the driving band to the whirl; that is, to have the ball bearing and center of the band pulley in approximately the same plane. Further still, as a large proportion of the commercially and practically usable spindles are of a diameter not exceeding $1\frac{3}{16}$ of an inch at the point which receives the driving band, and practical considerations make it impossible for spinners to use spindles with a larger whirl than this, it is essential that the ball bearing be of dimensions which can be accommodated within a whirl of this size. Finally the manufacturing cost of the spindle must be made as low as possible in view of the prices ruling in the industry.

With all of these considerations in view I have devised a spindle having a ball bearing, which can be accommodated within a whirl not greater than $1\frac{3}{16}$ of an inch in outside diameter, and is in the line of pull of the driving band. I have also provided the spindle with means by which it may center itself, that is adjust its position to rotate about an axis passing through the resultant center of gravity of the entire spindle blade, bobbin, and the accumulation of yarn on the bobbin, and means for cushioning the oscillatory or gyratory movement thus induced in the spindle; and I have also made provisions for lubrication such that the bearing may run submerged in oil, and provided a stop for preventing spattering of oil due to the churning action of the blade in doffing, and also for preventing oil from working to the exterior of the whirl and being thrown off therefrom by centrifugal force. In addition to the above I have so designed the blade that it may be readily removed from the base to permit the band being changed to spin the reverse twist, and for other purposes. The spindle having these or equivalent characteristics, together with the mechanical structures and elements which are features of these characteristics, constitute the invention which I claim here and which I will now proceed to describe in full detail, reference being had to the drawings forming a part of this application. In the drawings, Figure 1 is a vertical central section of a spindle representing one embodiment of my invention.

Figs. 2 and 3 are a plan and vertical elevation, respectively, of the inner race of the ball bearing.

Figs. 4 and 5 are, respectively, a plan and an elevation of the ball retainer.

Figs. 6 and 7 are, respectively, a plan and elevation of the oil stop.

Figs. 8, 9, and 10 are, respectively, a plan, a vertical elevation and a bottom plan of the part which I call the step sleeve of the spindle.

Figs. 11, 12, and 13 are, respectively, a plan, a vertical elevation, and an under plan of the bearing sleeve which forms the outer member of the ball bearing.

Fig. 14 is a detail elevation of a modified form of step sleeve.

All of Figs. 2 to 13 represent in detail the parts which are shown assembled in Fig. 1.

Referring to the drawings, 15 represents the base of the spindle, which has a tubular extension or socket 16 closed at the lower end adapted to pass through the rail of the ordinary spinning frame and threaded externally to receive a clamp nut 17. 18 is the blade, or spindle proper, on which is fixed the whirl 19, the latter being provided with a pulley 20 which receives the driving band. This pulley is located at the lower end of the whirl, which is at that point provided with a central axial chamber as large as possible to contain the ball bearings, formed by a series of balls 21 confined between the inner ball race 22, attached to the blade, and an outer ball race 23 which is a tube set at its lower end in a socket in the base 15, such socket being formed in part by an annular lip 24 rising from the base.

The inner ball race is a hardened steel sleeve fitted friction tight on the blade and abutting against the shoulder 25 of the latter. A groove is formed in the exterior of the race to receive the balls. A ball retainer 26, which is a ring or sleeve fitted to the exterior of the race 22 projects at its lower end far enough over the ball groove to retain the balls therein. The sleeve 23 which provides the outer race is preferably made of steel tubing properly hardened and formed with an inwardly indented or offset zone 27, the upper interior surface of which provides the contact surface and support for the balls. This ball bearing furnishes the entire support for the spindle, the bobbin, and the yarn or thread which is wound on the bobbin.

In the socket 16 is contained a sleeve 28, the lower end of which fits the lower end of the blade and forms a step bearing therefor to hold the blade upright and keep it steady. This step bearing sleeve rests on the end wall of the socket 16, but is of smaller diameter than the interior of said socket at all points except at a narrow zone 29 near its upper end, where it is enlarged sufficiently to fit loosely in the base. Thus the lower end of the sleeve is enabled to move from side to side in any direction until it contacts with the walls of the socket 16. It is prevented from rotating by a key 30 on the outer sleeve 23 of the ball bearing, such key being preferably a tongue cut out of the wall of said sleeve 23 at the lower end and offset inwardly to enter a groove 31 or keyway in the side of the step bearing sleeve. The sleeve 23 is fitted friction tight in the socket 24 so that it is fixed and stationary with respect to the base.

An arm 32 at one side of the base is bored to provide an internal passage 33, and rising from the arm is a post 34 which also contains a passage 35 opening into the passage 33. These passages are adapted to receive oil, and the post 35 rises above the ball bearing so that the oil may be maintained at a level above that of the bearing. A part of the usual doffer guard 36 provides the cover for the oil passage 35. In the side of the step bearing sleeve 28 registering with the passage 33 is a hole 37, and in the lower part of the same sleeve are holes 38 opening into that part of the sleeve which forms the lateral bearing for the lower end of the blade. Thus oil put into the passage 35 may flow into the interior of the step bearing sleeve 28 and into the space around such sleeve, filling such space and also rising in the chamber inclosed within the ball race sleeve 33 to a height above the balls 21. Thus there is maintained a body of oil which lubricates the bearings and provides a damper to check and retard sudden lateral movements of the lower end of the sleeve 28.

On the blade above the normal level of oil in the ball bearing chamber is mounted an oil stop 39 which is conveniently made as a disk tapered on its upper side toward the periphery to a fine edge and of a diameter approximately equal to the internal diameter of the sleeve 23. Its function is to arrest oil which tends to creep upwardly on the blade by centrifugal force, and throw off such oil upon the inner wall of the sleeve 23, thus preventing the oil from working up to the whirl and being thrown off from the lower end thereof.

The principal advantages of the spindle having the characteristic features above described are these.

(1) The ball bearing is in the same plane with the center of the driving band and therefore is in the line of pull exerted by the band.

(2) All parts of the ball bearing may be hardened without thereby making the spindle blade weak. Where the inner ball race is formed directly on the blade, the latter must be hardened and, being of small diameter in the location of the bearing, such hardening makes the blade brittle and very liable to break. By providing a sleeve for the inner race, the desired hardness of the bearing may be obtained without sacrificing the desired toughness of the blade.

(3) The use of a steel sleeve for the outer race, which may be made as hard as desired, enables this part of the bearing to be of small external diameter without sacrifice of strength, whereby the bearing may be contained within a whirl of a diameter not exceeding $\frac{13}{16}$ of an inch at that point which receives the driving band. Thereby I am able to provide a ball bearing in a spindle of the standard size, which in its externals is no different from the standard spindles and whirls in use.

(4) The lower end or step of the blade is capable of shifting laterally in order to permit the rotational axis of the spindle to coincide with the center of gravity of the combined blade, bobbin, and accumulation of yarn on the bobbin when such center of gravity is, as is usually the case, eccentric to the geometric axis of the spindle. The fulcrum point about which the blade swings to effect this result is the ball bearing; wherefore the bearing opposes no resistance to such shifting or oscillation of the blade, and such shifting does not apply any eccentric or unbalanced stresses upon the bearing.

(5) The displacement of the spindle foot or step is impeded by a body of oil in the part 16 of the base, which not only checks secondary vibrations and therefore makes steady the centering movements of the blade, but also prevents the step from suddenly striking the surrounding socket wall in any such manner as would cause a rebound. In some types of spinning machines, such as ring spinning frames, the spindles rotate at the rate of about ten thousand turns a minute, wherefore the greatest possible steadiness in the spindle when out of balance, that is when the center of gravity is eccentric to the geometrical axis, is of the greatest importance. Shocks and vibrations which in slow moving machinery would be of no consequence whatever are in the highest degree detrimental to the operation of such light and rapidly running machinery as that here under consideration.

(6) The ball bearing runs submerged in oil whereby it is continuously lubricated. The supply of oil may be renewed at any time by simply pouring it into the passage 35 and without stopping the machine.

(7) Spattering of oil when doffing, and throwing off of oil from the whirl is prevented by the stop 39.

(8) The bearing remains in the line of pull of the driving band when the spindle and whirl are lifted in doffing, as well as when they are in their normal running position.

(9) The sleeve which forms the exterior of the ball bearing is of uniform diameter throughout, both externally and internally, above the ball race zone 27, wherefore it permits the blade being removed from the base by simply lifting it up. The blade carries the inner ball race and the balls out from the interior of the sleeve, and take the whirl also from outside of the sleeve, without interference. The foot or step of the blade is withdrawn with equal ease from the step bearing sleeve. Such removal, and equally replacement of the spindle, is accomplished without disturbing any adjustment and without requiring the use of any tools.

(10) The sleeve 23 remains and constitutes at all times a chamber or cup for oil whether the blade is in place or not. That is, removal of the blade from the base does not cause release of the body of oil therein contained.

Various modifications of the details of construction may be made without departing from the spirit and scope of the invention as hereinbefore described and hereinafter claimed. For example in certain cases I may substitute for the sleeve 28 here shown a cushion step, as shown in Fig. 14, which comprises a fibrous mat or wrapping 40, conveniently a piece of woolen cloth, fastened upon a sleeve like the sleeve 28. This cushion is adapted to make contact with the sides of the socket extension 16 and perform essentially the functions of the body of oil previously described. I may also dispense with the sleeve 28, or its equivalent, altogether in cases where the blade may be made long enough or great enough in diameter to provide such displacement of oil as is necessary to get the results previously described in permitting self-centering of the spindle without objectionable vibrations.

While I claim as part of my invention the features hereinbefore described of the ball bearing which enable the same to be contained within a whirl of standard size, I do not otherwise limit the invention to the mechanical details or to the sizes and proportions of the parts, reserving the right to vary such sizes and proportions and other details in any manner as I may see fit. Thus I may make the inner ball race 22 with a slip fit instead of a tight fit on the blade; and I may employ a spring surrounding the step bearing, or the step or foot end of the blade, to cushion the lateral movement thereof. All these and other modifications within the scope of the claims are included within my invention and are intended to be protected herein.

The descriptive terms used in connection with the parts of the spindle in the foregoing specification are the technical terms commonly applied in the art of cotton spinning to the several parts of spindles. They are used without intention of limiting the invention to any specific forms of these parts.

What I claim and desire to secure by Letters Patent is:

1. The combination of a spindle, a supporting base, a ball bearing supported by said base and supporting said spindle, and an element connected with the spindle adapted to receive a driving band and arranged in the same plane with said ball bearing, the step or foot of the spindle being capable of lateral cushioned movement.

2. A spindle comprising a blade, a whirl having provisions for receiving a driving band associated therewith for rotating the same, and a ball bearing in the line of pull of such band supporting said blade, the blade having a step bearing arranged with capacity for cushioned lateral movement to permit alinement or centering of the center of gravity with the axis of rotation of the spindle blade with a bobbin thereon.

3. A spindle comprising in combination a blade, means for transmitting thereto the pull of the driving band, a ball bearing in the line of pull of such band supporting said blade and a step bearing for the end of the blade below said ball bearing, the step bearing being mounted with provision for lateral cushioned movement.

4. A spindle comprising a base having a hollow depending portion, a step bearing contained in said depending portion of such size as to be movable laterally therein at its lower end, a blade extending into said step bearing, a ball bearing above the step bearing supporting the blade, a driving pulley surrounding and in the same plane with said bearing connected to the blade, and a body of oil contained in said depending part and surrounding the step bearing and providing a cushion to impede the lateral movements thereof.

5. A spindle comprising in combination with a base, a separate hardened sleeve fixed to and rising from said base, its interior being formed as a ball race, a blade passing through said sleeve, an inner ball race fixed on said blade, balls between the inner race and the sleeve race, and a whirl mounted on the blade having a portion adapted to receive a driving band surrounding said sleeve; said sleeve rising above the ball races and containing a body of oil in which said races and balls are submerged, and a stop on the blade preventing escape of oil therefrom.

6. A spindle comprising in combination with a base, a sleeve rising from said base and having on its interior a ball race, a blade passing through said sleeve, an inner ball race fixed on said blade, balls between the inner race and the sleeve race, a whirl mounted on the blade having a portion adapted to receive a driving band surrounding said sleeve and located in the same plane with the ball races, and means for retaining a body of oil at and above the level of said ball bearing, including a stop preventing egress of oil therefrom.

7. A spindle comprising in combination, a blade, a ball bearing surrounding and supporting said blade, the outer member of said bearing being a sleeve rising above the bearing and providing an oil chamber, and an oil stop constituted by a disk or shoulder mounted on the blade above the bearing and within said sleeve.

8. A spindle comprising in combination, a blade, a ball bearing surrounding and supporting said blade, the outer member of said bearing being a sleeve rising above the bearing and providing an oil chamber, and a supply tube for oil entering said chamber and having its external orifice above the ball bearing, whereby to maintain the bearing submerged in oil.

9. In a spindle, a blade, a whirl mounted on the blade having a recess in its lower end and a band pulley surrounding such lower end, a base into which said blade projects, and a ball bearing on which the blade is mounted comprising a separate sleeve fixed at its lower end to said base and rising therefrom, having an inwardly offset zone forming the outer ball race, a separate inner ball race fixed to the blade, and a series of balls supported on the outer race and on which the inner race rests.

10. A spindle having a lateral ball bearing and means for oiling and retaining oil at a level above the said ball bearing; the lower end of the spindle being capable of lateral cushioned movement.

11. A spindle comprising a blade, a ball bearing surrounding the blade at a material distance from either end thereof, and means for supplying and maintaining a body of oil at and above said bearing, the lower end of the blade being capable of lateral movement.

12. A spindle having a ball bearing and external means for oiling and capable of retaining oil at a level above the said ball bearing, the lower end of the spindle being capable of lateral cushioned movement.

13. A spindle, a whirl thereon having means to take the pull of a driving band, a ball bearing for the spindle at or near the center of the band pull, and means for oiling and retaining oil at a level above the ball bearing; the lower end of the spindle being capable of lateral cushioned movement.

14. A spindle comprising a blade, a whirl on said blade having means to take the pull of a driving band, a ball race fitted to said blade having a ball bearing at or near the center of the band pull, means for oiling and retaining oil at the highest oiling level and above the ball bearing; the lower end of the spindle being capable of lateral cushioned movement.

15. A spindle having a blade fitted with a ball race and an oil stop, having a ball bearing at or near the center of the band pull, and means for oiling and retaining oil at the highest oiling level, said oil level being above the ball bearing and below the oil stop, the lower end of the spindle being capable of lateral cushioned movement.

16. A spindle having a blade fitted with a ball race, a whirl, and a base with a fixed sleeve extending upward within the whirl, said sleeve forming a ball race, balls interposed between said ball races, means for oiling and retaining oil above the balls and a step capable of lateral cushioned movement.

17. A spindle having a blade fitted with an annular ball race, means for retaining balls in the race, a whirl, a base with a fixed upward extending laterally inner ribbed bearing sleeve; said ribbed sleeve forming the outer lateral and thrust bearing for the balls; means for oiling and retaining oil at the highest oiling level and above the balls, and a step capable of a lateral cushioned movement.

18. A spindle having a blade fitted with an annular ball race and oil stop, means for retaining balls in the race; a whirl, a base with a fixed lateral inner ribbed bearing sleeve extending upward within the whirl; balls interposed between said ball race and bearing sleeve at a point at or near the line of the band pull, the ball bearing taking the lateral and thrust load, means for oiling and retaining oil at the highest oiling level and above the balls but below the oil stop; and a step capable of lateral cushioned movement.

19. A spindle comprising a base having a depending socket portion closed at its lower end, a blade contained in said socket portion and rising from the base, and a ball bearing supporting said blade and located above the lower end of the blade; said lower end being constructed of smaller diameter than the interior of said socket portion and being movable laterally therein to bring the center of gravity and rotational axis of the spindle into coincidence.

20. A spindle comprising a base having a depending socket portion closed at its lower end, a blade contained in said socket portion and rising from the base, and a ball bearing supporting said blade and located above the lower end of the blade; said lower end being constructed of smaller diameter than the interior of said socket portion and being movable laterally therein to bring the center of gravity and rotational axis of the spindle into coincidence, and a body of fluid in said socket member for damping the lateral movements of said lower end.

21. In a spinning machine the combination with a base, a blade extending into said base, a sleeve secured to said base which provides a bearing for the blade and a chamber for containing oil, a complemental bearing on the blade having a ball groove, and a retainer on said complemental bearing having means for retaining balls in said groove.

22. In a spinning machine the combination with a base, of a removable blade, a ball race forming one member of a ball bearing carried by said blade and provided with means for permanently retaining a series of balls, and a sleeve fixed to said base surrounding the blade and provided with an inwardly offset zone forming an integral ball race, the blade being freely movable with the race and balls carried thereby through said sleeve from the base.

23. In a spinning machine the combination with a base having a sleeve forming a bearing element, a blade contained within said sleeve and being movable endwise therein for doffing, a ball bearing connected to said blade and running in contact with said sleeve, and a whirl connected with the blade and surrounding the sleeve having a portion adapted to receive a band and being in the same plane with the ball bearing when doffing as well as when running.

In testimony whereof I have affixed my signature.

FRED HILDRETH CHAPMAN.